(12) United States Patent
Pacifici (10) Patent No.: US 9,990,705 B2
(45) Date of Patent: *Jun. 5, 2018

(54) ATMOSPHERIC COMPENSATION IN SATELLITE IMAGERY

(71) Applicant: DigitalGlobe, Inc., Longmont, CO (US)

(72) Inventor: Fabio Pacifici, Longmont, CO (US)

(73) Assignee: DIGITALGLOBE, INC., Westminster, CO (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/186,171

(22) Filed: Jun. 17, 2016

(65) Prior Publication Data

US 2016/0300336 A1     Oct. 13, 2016

Related U.S. Application Data

(63) Continuation of application No. 13/840,743, filed on Mar. 15, 2013, now Pat. No. 9,396,528.

(51) Int. Cl.
| | |
|---|---|
| *G06K 9/00* | (2006.01) |
| *G06T 5/20* | (2006.01) |
| *G06T 5/00* | (2006.01) |
| *G06T 7/514* | (2017.01) |

(52) U.S. Cl.
CPC ............. *G06T 5/20* (2013.01); *G06T 5/001* (2013.01); *G06T 7/514* (2017.01); *G06T 2207/10032* (2013.01); *G06T 2207/10036* (2013.01); *G06T 2207/10041* (2013.01); *G06T 2207/30181* (2013.01)

(58) Field of Classification Search
None
See application file for complete search history.

(56) References Cited

U.S. PATENT DOCUMENTS

| 4,779,980 | A | | 10/1988 | Hulstrum et al. | |
|---|---|---|---|---|---|
| 5,255,190 | A | * | 10/1993 | Sznaider | G06T 15/50 348/33 |
| 5,477,052 | A | | 12/1995 | Doctor | |
| 6,484,099 | B1 | * | 11/2002 | Holzer-Popp | G01C 11/00 702/2 |

(Continued)

OTHER PUBLICATIONS

International Search Report for PCT/US2014/021954, dated Dec. 23, 2014.

(Continued)

*Primary Examiner* — Iman K Kholdebarin
(74) *Attorney, Agent, or Firm* — Robert G. Crouch; Marsh Fischmann & Breyfogle LLP (57) ABSTRACT

Techniques for atmospheric compensation in satellite imagery that include converting an image including an array of radiance values to an array of surface reflectance values. The conversion is performed in an automated fashion by identifying one or more portions of the image for which the surface reflectance can be estimated and determining the Aerosol Optical Depth (AOD) by iteratively comparing the radiance value captured by the image sensor to a calculated radiance value (based on the known surface reflectance, historical values for other atmospheric parameters, and the AOD) and adjusting the AOD until the calculated radiance value is substantially the same as the captured radiance value.

15 Claims, 5 Drawing Sheets

(56) References Cited

U.S. PATENT DOCUMENTS

| | | | |
|---|---|---|---|
| 6,665,438 B1* | 12/2003 | Lin | G06K 9/0063 382/191 |
| 6,909,815 B2 | 6/2005 | Bernstein et al. | |
| 7,046,859 B2 | 5/2006 | Bernstein et al. | |
| 7,337,065 B2* | 2/2008 | Adler-Golden | G06K 9/0063 702/3 |
| 7,353,690 B2* | 4/2008 | Solheim | G01K 11/006 342/26 R |
| 7,558,673 B1* | 7/2009 | Qu | G01W 1/02 374/109 |
| 7,580,127 B1* | 8/2009 | Mayor | G01N 21/21 356/337 |
| 7,656,526 B1* | 2/2010 | Spuler | G01N 21/538 356/336 |
| 8,149,268 B1* | 4/2012 | Meyers | H04N 5/144 348/42 |
| 8,289,153 B2 | 10/2012 | Kirchner et al. | |
| 8,340,360 B2 | 12/2012 | Chen et al. | |
| 8,761,506 B1* | 6/2014 | Padwick | G06K 9/0063 382/167 |
| 2002/0096622 A1* | 7/2002 | Adler-Golden | G06K 9/0063 250/208.1 |
| 2003/0064023 A1* | 4/2003 | Driehuys | A61B 5/055 424/9.3 |
| 2004/0153284 A1* | 8/2004 | Bernstein | G01J 3/28 702/178 |
| 2004/0210391 A1 | 10/2004 | Kolodner et al. | |
| 2006/0001547 A1* | 1/2006 | Davenport | B61L 5/1881 340/641 |
| 2006/0126959 A1* | 6/2006 | Padwick | G06K 9/0063 382/254 |
| 2007/0065857 A1 | 3/2007 | Glaser et al. | |
| 2007/0247629 A1* | 10/2007 | Kim | G01N 21/59 356/438 |
| 2008/0063237 A1* | 3/2008 | Rubenstein | G06K 9/0063 382/103 |
| 2009/0262978 A1* | 10/2009 | Zavagli | G06K 9/0063 382/103 |
| 2010/0002947 A1* | 1/2010 | Riley | G06K 9/0063 382/254 |
| 2010/0008595 A1* | 1/2010 | Riley | G06K 9/0063 382/254 |
| 2012/0112096 A1* | 5/2012 | Meyers | G01N 21/21 250/459.1 |
| 2012/0281085 A1* | 11/2012 | Ingram, Jr. | G06K 9/0063 348/135 |
| 2013/0032705 A1* | 2/2013 | Armstrong | G01J 1/42 250/236 |
| 2013/0057687 A1* | 3/2013 | Ehlgen | G01N 21/538 348/148 |
| 2013/0179078 A1* | 7/2013 | Griffon | G06Q 50/26 702/3 |
| 2013/0286377 A1* | 10/2013 | Heege | G01S 11/14 356/4.07 |
| 2014/0270332 A1* | 9/2014 | Pacifici | G06T 5/001 382/100 |
| 2014/0270502 A1* | 9/2014 | Leonard | G06T 5/50 382/165 |

OTHER PUBLICATIONS

Bo-Cai Gao, et al, "An Atmospheric Correction Algorithm for Remote Sensing of Bright Coastal Waters Using MODIS Land and Ocean Channels in the Solar Spectral Region," IEEE Transactions on Geoscience and Remote Sensing, vol. 45, No. 6, Jun. 1, 2007.

Liu, C, H, et al, "Image-Based Derivation of Aerosol Optical Depth to Correct the Atmospheric Effect for Satellite Image," Quantitative Remote Sensing for Science and Applications, Firenze, Jul. 10, 1995.

Zagolski, F., et al, "Atmospheric Corrections of AVIRIS Images with a Procedure Based on the Inversion of 5S Model," Geoscience and Remote Sensing Symposium, Aug. 8, 1994.

Extended European Search Report, Application No. PCT/US2014021954, Oct. 27, 2016.

* cited by examiner

ATMOSPHERIC COMPENSATION IN SATELLITE IMAGERY

CROSS REFERENCE TO RELATED APPLICATIONS

This application is a continuation of U.S. patent application Ser. No. 13/840,743 filed on Mar. 15, 2013, which is incorporated herein in its entirety by reference.

BACKGROUND

The use of satellite-based and aerial-based imagery is popular among government and commercial entities. One of the challenges in obtaining high quality images of the earth is the presence of the atmosphere between the surface of the earth and the satellite collecting the image. This atmosphere has water vapor and aerosols therein that can cause the absorption and scattering of light. This scattering can redirect light in an undesirable fashion. This can include scattering desirable light away from the satellite's imaging system as well as scattering undesirable light toward the imaging system.

If the atmospheric conditions are sufficiently understood, it might be theoretically possible to convert the captured image of the earth's surface (a measurement of radiance received at the satellite) to an image of surface reflectance. Several techniques exist for making such atmospheric corrections or compensations to images—Quick Atmospheric Correction (QUAC) and Fast Line-of-sight Atmospheric Analysis of Spectral Hypercubes (FLAASH) are some of the most common as they are both part of the ENVI software suite available from Exelis Visual Information Solutions, Inc. FLAASH is highly accurate, but requires the knowledge of the atmospheric components and their manual input and is thus fairly slow and often it is not possible to obtain reliable atmospheric information to perform the correction. QUAC is fully automated and thus much faster, but its accuracy is much lower than FLAASH.

QUAC is a visible-near infrared through shortwave infrared (VNIR-SWIR) atmospheric compensation method for multispectral and hyperspectral imagery. As used herein, "multispectral" and "hyperspectral" each refer to a plurality of discrete spectral bands (e.g., a blue band in the 442-515 nanometer range, a green band in the 506-586 nanometer range, a yellow band in the 584-632 nanometer range, a red band in the 624-694 nanometer range, and other discrete color bands) with multispectral referring to systems with a relatively small number of discrete bands (e.g., 7 bands) and hyperspectral referring to systems with a large number of discrete bands (e.g., 110 bands). "Panchromatic" is a term that refers to a single band with a broad wavelength range and may also be referred to as black-and-white (e.g., 405-1053 nanometers, 397-905 nanometers, 447-808 nanometers or any other range that covers a broad spectrum. Often, panchromatic bands cover a substantial majority of the visible and/or near-infrared light spectrum, but this is not necessarily the case.

Unlike other first-principles atmospheric correction methods, QUAC determines atmospheric compensation parameters directly from the information contained within the scene (observed pixel spectra), without ancillary information. QUAC performs a more approximate atmospheric correction than FLAASH or other physics-based first-principles methods, generally producing reflectance spectra within approximately +/-15% of the physics-based approaches. QUAC is based on the empirical finding that the average reflectance of a collection of diverse material spectra, such as the endmember spectra in a scene, is essentially scene-independent. All of this means significantly faster computational speed compared to the first-principles methods. FLAASH is a first-principles atmospheric correction tool that corrects wavelengths in the visible through near-infrared and shortwave infrared regions, up to 3000 nm. Unlike many other atmospheric correction programs that interpolate radiation transfer properties from a pre-calculated database of modeling results, FLAASH incorporates the MODTRAN4 radiation transfer code. Again, as stated above, FLAASH is highly accurate, but requires manual input and is thus fairly slow. QUAC is fully automated and thus much faster, but its accuracy is much lower than FLAASH. And, each of QUAC and FLAASH require multispectral data, and cannot operate with panchromatic data alone.

Highly accurate classification of landcover types and states is essential to extracting useful information, insight and prediction for a wide variety of applications. In many cases, this classification of type and state is dependent on multi-temporal observations. In all cases, there are a number of confounding factors to deal with including opaque clouds, cirrus clouds, aerosols, water vapor, ice, snow, shadows, bidirectional reflectance distribution factor (BRDF) effects and transient coverings like water, dust, snow, ice and mobile objects. Pseudo invariant objects (PIOs) are often used for on-orbit calibration of relatively stable sensors because the PIOs are in useful states often enough. But there are not enough truly stable PIOs in the world with required spatial density to deal with the highly variable confounding factors of images.

Prior art makes simplifying assumptions as to presence and stability of calibrating materials, and uniformity of atmospheric effects that introduce significant errors across images. We have determined that ignoring the dynamic phenological variations and atmospheric element gradients within a scene can create classification errors of 45% or more. Multi-temporal anomaly detection suffers accordingly.

SUMMARY

Disclosed herein is a method of compensating for atmospheric events in satellite images. The method includes receiving image data representing an image of the Earth based on the radiance received; receiving Earth coordinate data related to the image data; receiving temporal data related to the image data; retrieving one or more atmospheric characteristics from a database, the retrieving being based on the earth coordinate data and the temporal data; processing the image data to determine Aerosol Optical Depth for the image data; and converting the image from radiance to surface reflectance by using the determined Aerosol Optical Depth.

The one or more atmospheric characteristics may include water vapor, temperature, elevation, and aerosol type. The processing operation may include assuming an Aerosol Optical Depth for at least a portion of the image; deriving a surface reflectance of the portion of the image from the Aerosol Optical Depth, the retrieved atmospheric characteristics, and the radiance received; calculating an expected radiance for at least the portion of the image based on the derived surface reflectance, the assumed Aerosol Optical Depth, and the retrieved atmospheric characteristics; comparing the expected radiance to the actual radiance received for at least the portion of the received image; and adjusting the Aerosol Optical Depth in a direction to bring the expected radiance closer to the actual radiance received. The calculating, comparing, and adjusting operations may be performed iteratively until the comparison shows the expected radiance to be within a predetermined threshold of the actual radiance received. The deriving the surface reflectance may include deriving the surface reflectance for each of a target portion of the portion and a background portion of the portion. The image may be used to derive both a radiance received for a target region of the image and a radiance received for a background region of the image. The radiance received for the background region may be derived by taking an average radiance for the image. The radiance received for the background region may be derived by using a convolution filter for the region of the image proximate to the target region and/or by using a gamma-based filter based on the retrieved atmospheric characteristics and the wavelength of the radiance received.

The entire method may be performed automatically, without human intervention. The image data used to determine the Aerosol Optical Depth may be purely panchromatic image data. The image data used to determine the Aerosol Optical Depth may include multispectral image data.

Also disclosed herein is a method for determining an Aerosol Optical Depth in the atmosphere relative to a satellite or aerial image of the Earth. The method includes receiving a pixelated image having radiance values for each pixel in the image; retrieving values for certain atmospheric parameters, including an initial estimate of an Aerosol Optical Depth atmospheric parameter; determining a portion of the image for which an estimate of the surface reflectance can be made; estimating the surface reflectance of the portion of the image; based on the estimated surface reflectance of the portion of the image and the certain atmospheric parameters, calculating the expected radiance for the portion of the image; comparing the radiance from the received image for the portion of the image to the expected radiance for the portion of the image; and adjusting the Aerosol Optical Depth atmospheric parameter if the comparison reveals a difference greater than a threshold value. The calculating, comparing, and adjusting operations are repeated as necessary until the comparison reveals a difference within the threshold value.

The portion of the image for which an estimate of surface reflectance can be made may be a dark object. The estimate of surface reflectance for the dark object may be based on the radiance value for the dark object, the radiance value for other portions of the image, and the certain atmospheric parameters. The portion of the image for which an estimate of surface reflectance can be made may be an object that varies in a known fashion throughout the year. A determination may be made as to which of a plurality of object classes the object belongs to. The plurality of object classes may include forests, crops, and man-made surfaces. Typical surface reflectance values throughout the year may be known for each of the object classes. The Aerosol Optical Depth and the retrieved atmospheric parameters may be used to convert the image from an array of radiance values to an array of surface reflectance values. The image data used for determining the Aerosol Optical Depth may be purely panchromatic image data. The image data used for determining the Aerosol Optical Depth may include multispectral image data.

BRIEF DESCRIPTION OF THE DRAWINGS

The disclosure herein is described with reference to the following drawings, wherein like reference numbers denote substantially similar elements.

DETAILED DESCRIPTION

While the embodiments disclosed herein are susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives of embodiments of the invention as defined by the claims. The disclosure is described with reference to the drawings, wherein like reference numbers denote substantially similar elements.

Figure 1:
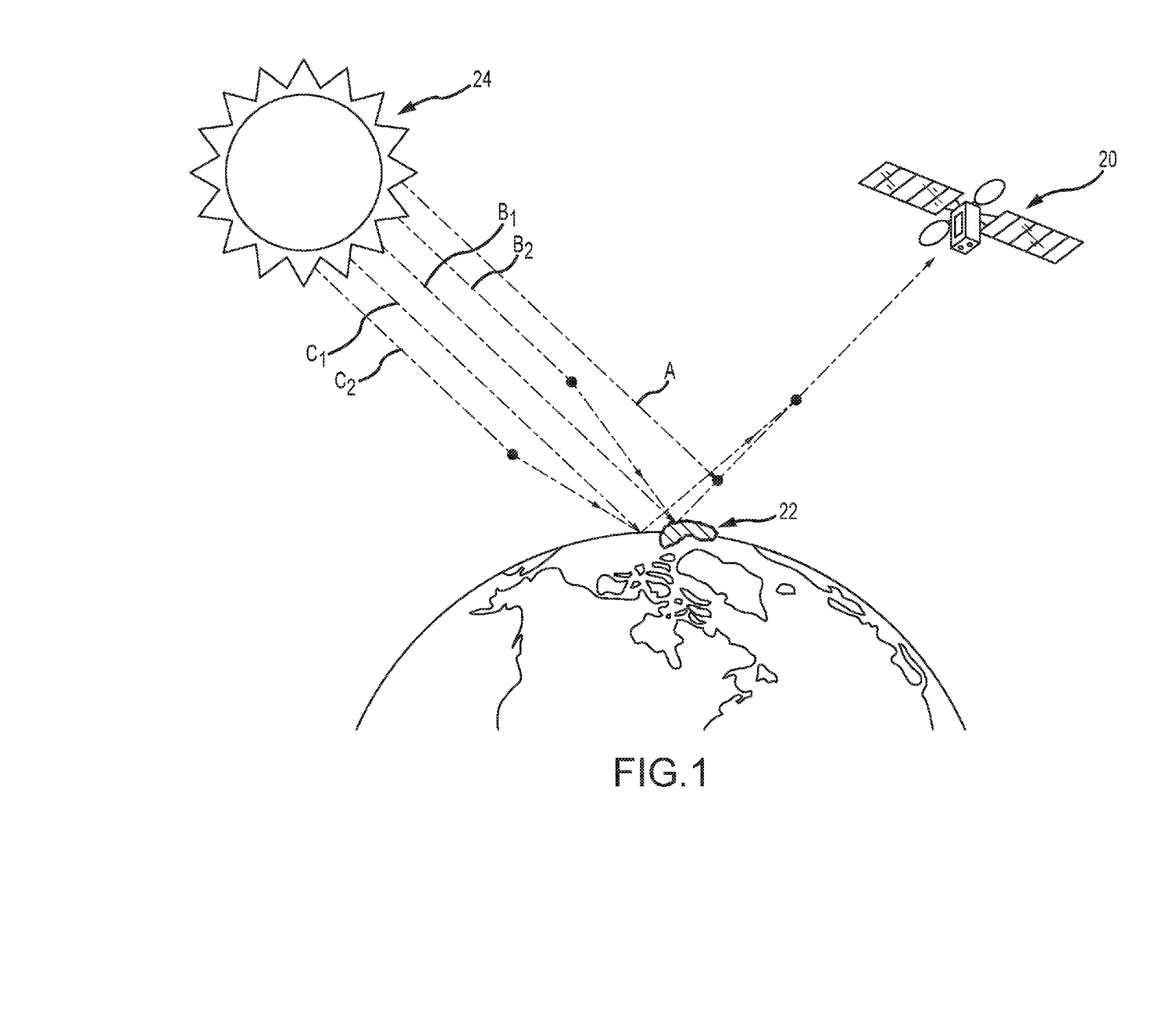
FIG. 1 is an illustration of solar illumination being collected by an image sensor in a satellite after being reflected by one of a target on the ground, a background area on the ground, or the atmosphere.

FIG. 1 shows a satellite 20 sensing reflected energy coming thereto from the direction of a target 22. The image sensor in the satellite 20 or aerial vehicle measures the radiance (light energy) received at the sensor. Of course, the radiance received is a function of the position of the sun 24, the position of the satellite 20, the atmospheric conditions (including the presence of clouds) and other factors. It is desirable to instead have the surface reflectance as opposed to the radiance. The primary atmospheric characteristics that cause the captured image (radiance) to be different than the actual surface reflectance are water vapor, temperature, elevation, and aerosol optical depth and type. Of course, elevation has essentially no temporal variation, while water vapor and temperature generally vary on the order of weeks (with some faster variation). Because of this, the values for water vapor, temperature, and elevation can be retrieved from a historical global database taking into account the geographic location, and the time of year, or alternatively one or more of these values could be obtained from a current database, to the extent such data is available. The land cover can also be used to make a reasonable guess about the aerosol type. Aerosol optical depth (AOD) on the other hand has a high variability on the order of hours. Thus, it is only the AOD that needs to be determined since the other parameters can be reasonably determined (to a first statistical approximation) from historical data.

Discussed herein is a method for deriving the AOD directly from image data and then using the AOD (along with the water vapor, temperature, elevation, and aerosol type from a historical database) to convert the image from an array of radiance values to an array of surface reflectance values for each pixel. This is done by removing the effects of atmosphere and solar illumination. This technique is well suited for very high spatial resolution (VHR) optical imagery, such as the imagery obtained by DigitalGlobe's constellation of imaging satellites. The techniques taught herein may independently use images from each of panchromatic (PAN) and visible/near-infrared (VNIR) sensors to determine the AOD. It is believed that none of the other techniques (e.g., QUAC and FLAASH) are capable of operating effectively with solely or purely panchromatic image data, as they rely on multispectral image data. As will be discussed below, results thus far indicate that the methods taught herein are fully automated and accurate within 2-3%.

The atmosphere's effect under cloud-free circumstances in remote sensing of the Earth's surface with an optical satellite is shown in FIG. 1. The radiance sensed by the satellite 20 includes different contributions: radiation scattered by the atmosphere and never reaching the ground that is scattered into the viewing direction; radiation reflected by the ground target in the viewing direction; and radiation reflected by the background (the target's surroundings) and being scattered by the atmosphere in the viewing direction. This last contribution is known as the adjacency effect. In certain scenarios, there may also be other contributions.

The first source of radiation described above is the one that would already be present if both the target and background reflected no light. The second two sources described above can each be split into two parts: reflected direct solar radiation and reflected sky radiation. Of course, the reflected sky radiation is caused by solar radiation that is scattered in the downward direction. The target's surroundings often include a complex heterogeneous landscape, and the reflectance of both target and background are not well approximated as being Lambertian. However, it is possible to describe the atmospheric effect and the interactions with the earth surface in a quantitative yet concise way using the four-stream radiative transfer and its associated simple terminology.

The combined effect of the atmosphere and the reflectance of the target and the target's surroundings are described with the quantity called planetary reflectance $r_p$:

$$r_p = \rho_{so} + \frac{\tau_{ss}\overline{r_{dd}} + \tau_{sd}\overline{r_{dd}}}{1 - \overline{r_{dd}}\rho_{dd}}\tau_{do} + \frac{\tau_{sd}\tau_{ss}\overline{r_{sd}}\rho_{dd}}{1 - \overline{r_{dd}}\rho_{dd}}r_{do}\tau_{oo} + \tau_{ss}r_{so}\tau_{oo} \quad \text{(Equation 1)}$$

where $\rho_{so}$ is the reflectance received solely as a result of scattering from the atmosphere (where the light never reaches the ground), $r_{so}$ is the target bidirectional reflectance, $r_{do}$ is the target directional reflectance for diffuse incidence, $\overline{r_{sd}}$ is the average surroundings diffuse reflectance for solar incidence, $\overline{r_{dd}}$ is the average surroundings diffuse reflectance for incidence, $\tau_{so}$ is the "top of atmosphere" (TOA) atmospheric bidirectional reflectance, $\tau_{dd}$ is the bottom of the atmosphere spherical albedo, $\tau_{ss}$ is the direct atmospheric transmittance in the direction of the sun, $\tau_{oo}$ is the direct atmospheric transmittance in the direction of viewing, $\tau_{sd}$ is the diffuse atmospheric transmittance for solar incidence, $\tau_{do}$ is the directional atmospheric transmittance for diffuse incidence, and $r_p$ is the TOA (planetary) reflectance (which is the local bidirectional reflectance of the earth atmosphere condition).

Note that all these quantities are wavelength-dependent.

The terms on the right side of Equation 1 can be identified (from left-to-right) as being due to:

A. path reflectance caused by scattered sunlight within the atmosphere (contribution A in FIG. 1);

$B_1$. sunlight reflected by the target directly to the satellite (contribution $B_1$ in FIG. 1)

$B_2$. skylight reflected by the target directly to the satellite (contribution $B_2$ in FIG. 1); and C. path reflectance from the target's surroundings (the adjacency effect, contribution C in FIG. 1) (note that this effect can be split in the contribution from direct solar illumination of the surroundings that are directed to the satellite $C_1$ and indirect solar illumination of the surroundings that are directed to the satellite $C_2$).

It is important to point out that all the contributions for scene radiation modeling are present, except for the atmospheric parameters. These can be estimated by means of the MODTRAN interrogation technique proposed in W. Verhoef and H. Bach, "Simulation of Hyperspectral and Directional Radiance Images using Coupled Biophysical and Atmospheric Radiative Transfer Models", Remote Sensing of Environment, vol. 87, no. 1, pp. 23-41, September 2003, the contents of which are incorporated herein by reference.

Assuming a uniform Lambertian surface, the radiance at the sensor can be written in a simplified form as follows:

$$L = L_0 + G_b \frac{r_b}{1 - \overline{r_b}S} + G_t \frac{r_t}{1 - \overline{r_b}S} \quad \text{(Equation 2)}$$

where $r_t$ is target surface reflectance, $r_b$ is surrounding region reflectance, S is atmospheric spherical albedo, L is the radiance at the sensor, $L_o$ is the radiance of atmosphere backscattering, $G_b$ surrounding pixel coefficient (depend on atmospheric and geometric condition), and $G_t$ target pixel coefficient (depend on atmospheric and geometric condition).

Solving for $r_t$, the final formulation can be expressed as:

$$r_t = \frac{L - L_0 + \frac{G_b}{G_t}(L - \overline{L})}{G_b + G_t + (\overline{L} - L_0)S} \quad \text{(Equation 3)}$$

In order to derive all five effective parameters for a given atmospheric state and geometry, three MODTRAN runs have to be computed, with spectrally flat surface albedos of 0%, 50% and 100%, respectively. More details on this can be found in Verhoef and Bach.

Figure 2:
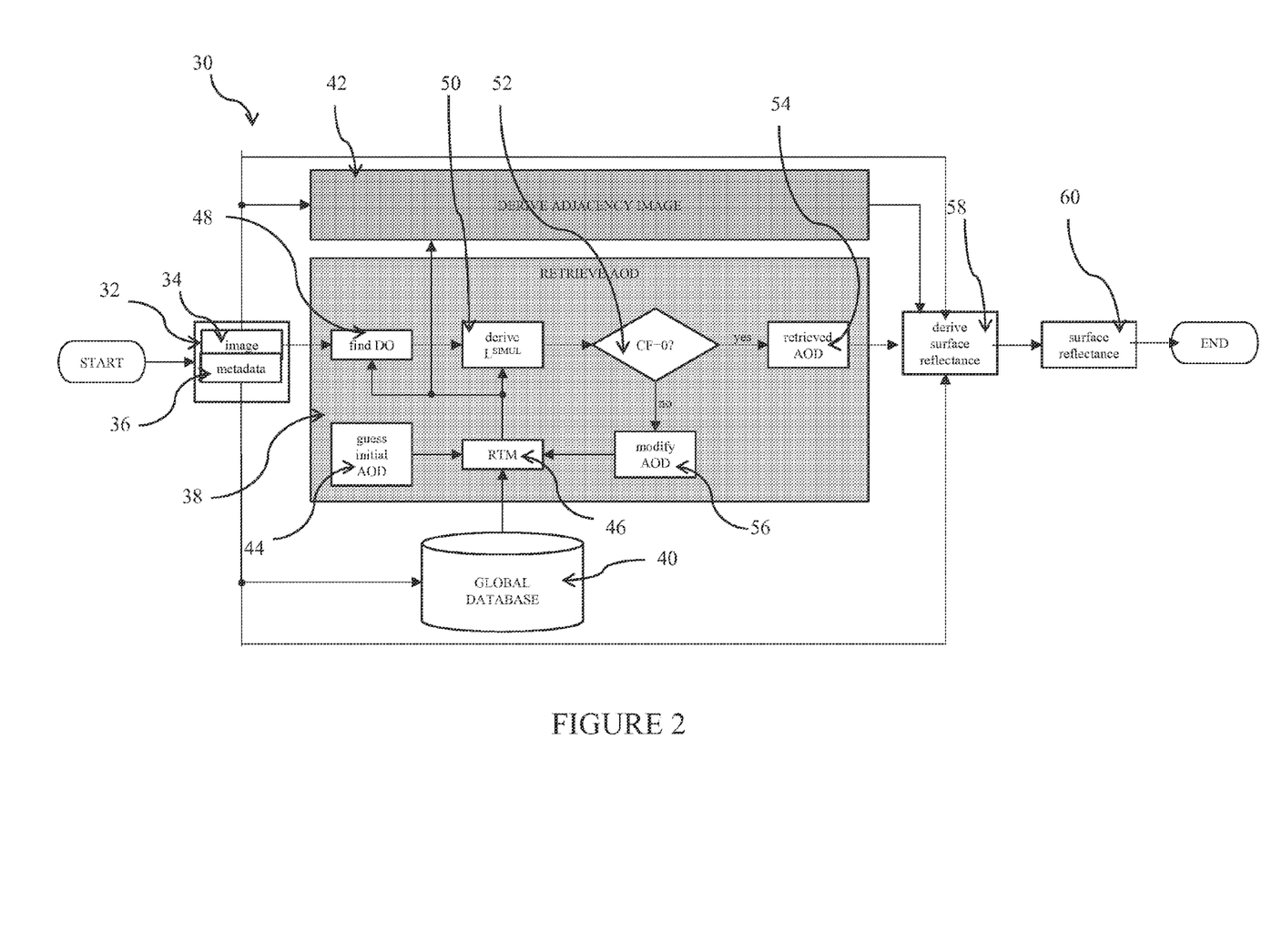
FIG. 2 is an illustration of portions of an atmospheric compensation algorithm.

FIG. 2 shows the process flow of the atmospheric correction algorithm. Box 32 shows image data 34 and associated metadata 36 being retrieved. This metadata may include the acquisition time, the ground location (e.g., latitude and longitude) (in at least one embodiment this is determined on a pixel-by-pixel basis), the position of the sun relative to the ground location (e.g., azimuth and elevation), and the position of the satellite relative to the ground location (e.g., azimuth and elevation). This image and metadata will be used in the Retrieve AOD box 38 and Derive Adjacency Image box 42, each described further below.

Also, from this metadata 36, a global database 40 can be accessed to provide historical values of some or all of the following parameters: temperature, land cover, water vapor, AOD, and elevation. There could also be included at this point in the algorithm a determination of the location of clouds. For example, a cloud edge feature height mask previously computed in accordance with the teachings in concurrently-filed U.S. patent application Ser. No. 13/835, 804, entitled "Using Parallax in Remote Sensing to Determine Cloud Feature Height,", the contents of which are incorporated herein by reference.

Temperature could be roughly approximated by being at one of several temperature values (e.g., −16 C, −1 C, 15 C, 21 C, and 27 C) or a more precise value for temperature could be used. Aerosol type may be one of urban, rural, desert, maritime, NAVI (an oceanographic ocean type), or a mixture of one of these. Water vapor column might be expressed in grams per square centimeter. AOD is unitless in one embodiment.

Figure 4:
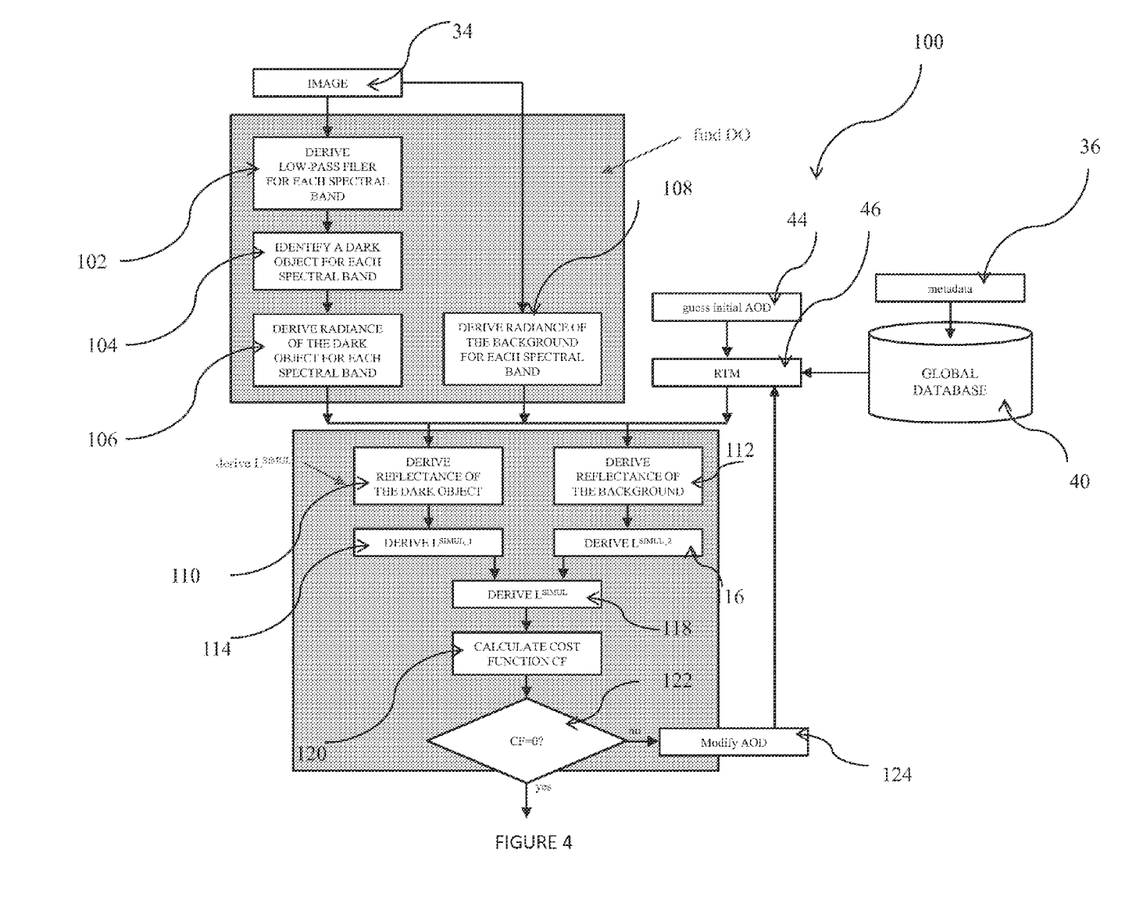
FIG. 4 is an illustration of portions of a Retrieve AOD portion of the algorithm on FIG. 2.

The Retrieve AOD function 38 is shown in simplified form in FIG. 2 and in more detail in FIG. 4. First, an initial guess of AOD is made 44 (which will very likely later be iterated to a better estimate of AOD). This may be done in any suitable manner. In one embodiment, an assumption is made that visibility is good. In another embodiment, the initial guess for AOD may be related to the past calculated AOD value, if there has been a past calculation, or retrieved from the global database. However the initial guess for AOD is made, this value for AOD is supplied to the Radiative Transfer Model (RTM) 46, as are the previously-described historical values retrieved from the global database.

In one embodiment, the Radiative Transfer Model (RTM) used is MODTRAN. MODTRAN (MODerate resolution atmospheric TRANsmission) is a computer program designed to model atmospheric propagation of electromagnetic radiation for the 0.2 to 100 um spectral range. The most recently released version of the code is MODTRAN5. All MODTRAN code development and maintenance is currently performed by Spectral Sciences while the Air Force handles code validation and verification. MODTRAN5 is written entirely in FORTRAN. It is operated using a formatted input file. Third parties, including Ontar, have developed graphical user interfaces to MODTRAN in order to facilitate user interaction and ease of use. Visit http://modtran5.com/ for more information. Basically, the RTM uses the AOD and the historical values from the global database to calculate S, $L_0$, $G_t$, and $G_b$.

The retrieval of the aerosol optical depth (AOD) can be obtained from the so-called dark-object (DO), i.e. a pixel (or group of pixels) that has the lowest value of radiance measured by the sensor. The concept of dark-object has been extensively investigated in the literature, and several examples can be found in P. S. Chavez, "An Improved Dark-Object Subtraction Technique for Atmospheric Scattering Correction of Multispectral Data", Remote Sensing of Environment, vol. 24, no. 3, pp. 459-479, April 1988, the contents of which are incorporated herein by reference.

A dark object (DO) is located (48) in the image. This may be done in any suitable manner, but one manner of doing so is described in conjunction with FIG. 4 below. As will be described below, using the initial value for AOD and the values from the global database, the expected TOA radiance for the DO can be computed (50). The expected radiance for the DO can then be compared (52) to the measured radiance for the DO, with an error calculation. If the difference is more than a predetermined threshold, the AOD is modified (56) and a new expected radiance is computed which can then be compared to the measured radiance. This process proceeds in an iterative fashion until an AOD is found that provides an expected radiance that is sufficiently close (54) to the measured radiance. That value for AOD can then be used for that image to convert (58) the measured radiance for each pixel to a surface reflectance for each pixel in the image.

Figure 3:
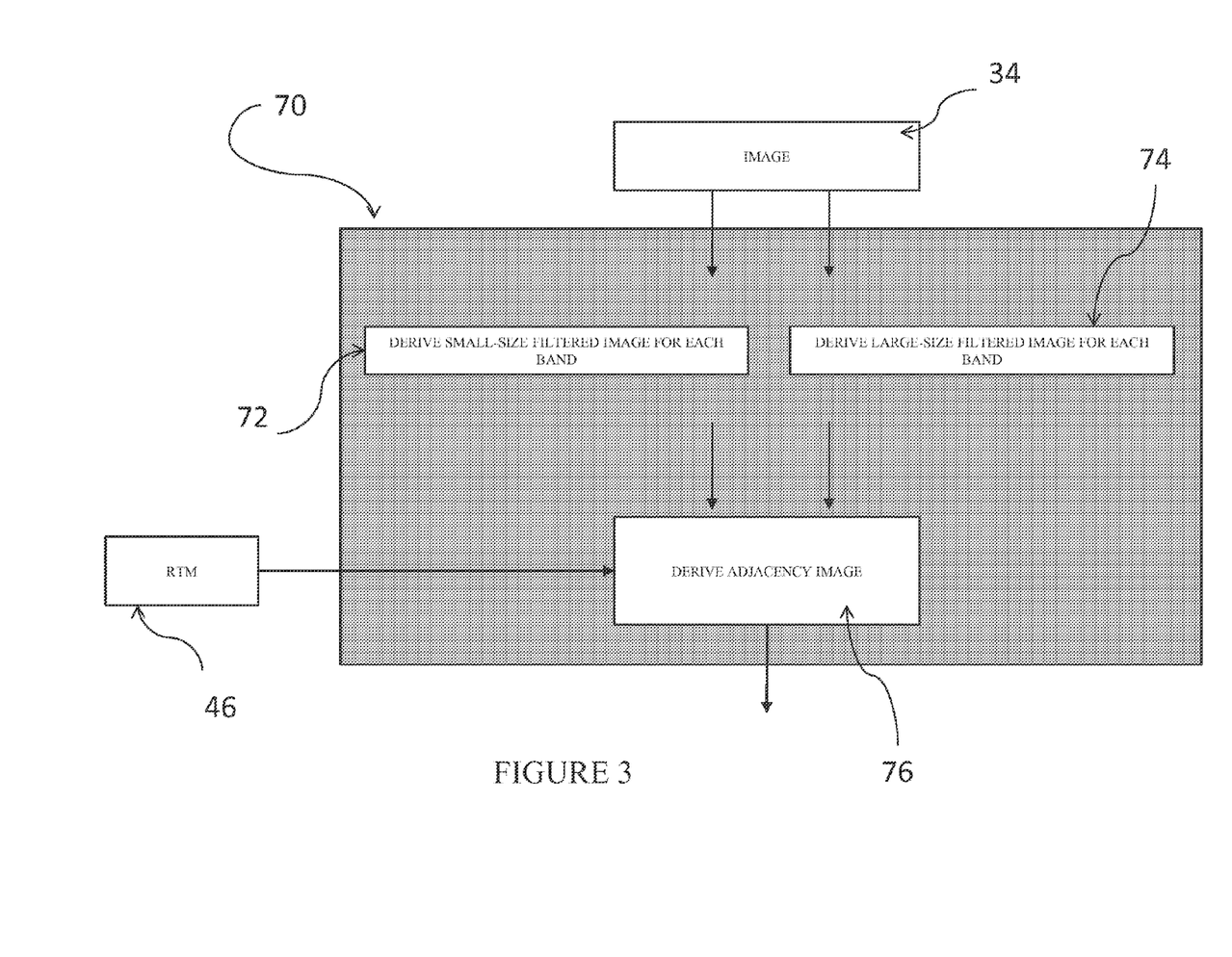
FIG. 3 is an illustration of the Derive Adjacency Image portion of the algorithm of FIG. 2.

FIG. 3 shows the algorithm 70 for calculating the adjacency effect. The atmospheric adjacency effect is caused by scattering of radiation from objects adjacent to the target. This effect is strongly wavelength-dependent and it is also influenced by the atmospheric state and its vertical structure. It was experimentally found that a single large-size convolution filter produces an underestimation of the surface reflectance in cases of small low-reflective spatial discontinuities (e.g., a small park within a highly built up area in the visible bands). To overcome this limitation, a second small-size convolution filter $\overline{L^s}$, can be used.

As can be seen in FIG. 3, in one embodiment, the algorithm 70 takes the image 34 and derives both a small-size filtered image 72 and a large-size filtered image 74 for each spectral band. The small-size filter may be a simple 5×5 convolution filter. The large-size filter may be a gamma-based filter, whose components are associated with the atmospheric properties of the image and specific wavelength. From these two derived images 72 and 74, the adjacency image is derived 76, with inputs from the Radiative Transfer Model 46.

An interesting iterative approach has been proposed in U.S. Patent Publication No. 2010/0008595 by Riley et al., where the low intensity portion of an image (i.e., the DO) is assumed to be associated with reflectance of light principally due to atmospheric effect, such as haze. Different values for the visibility parameter (i.e., the AOD) are used to generate models iteratively until a visibility parameter value is found that provides an atmospheric model that matches the radiance of the DO. However, the assumption that the dark-object is completely black, that i.e. $r_t=0$, is generally not true. For example, a dark water body has a very low reflectance in the NIR wavelengths, but it may have a much higher reflectance at shorter wavelengths (less than 550 nm). This leads to an overestimate of the AOD if the complete radiative model (Equation 2) is not used. Thus, the techniques disclosed herein are an improvement over Riley, since he used a reflectance for the DO of 0.0, plus he did not use the complete radiative transfer model.

Instead the techniques taught herein exploit the full model as proposed by Verhoef and Bach. Specifically, after a dark-object is detected and its value is converted to radiance, an initial value of AOD is used to retrieve the five unknowns in Equation 2. It was experimentally found that it is necessary to apply a small size convolution filter before searching for the DO to reduce the noise that may be present in the lower-end of the histogram. Successively, two independent simulations of TOA radiance are performed, one for radiance from the target and the adjacency (or background) radiance. These two quantities are then combined together based on their magnitude.

Finally, an error (referred to as cost function (CF) in FIGS. 2 and 4) is computed between the measured DO TOA radiance and the expected TOA radiance.

It is important to note that it is necessary to preserve the sign of the error. In fact if error≥0, then the initial AOD guess is lower than the correct one. Therefore, the process is iterated using a higher value of AOD. Else if error≤0, then the initial AOD guess is higher than the correct one. Therefore, the process is iterated using a lower value of AOD. The iterative process ends with |error|≤ϵ with ϵ→0.

The Aerosol Optical Depth Retrieval Building Block 100 is shown in more detail in FIG. 4. This may include deriving 102 a low-pass filter for each spectral band (e.g., a simple 3×3 convolution filter) and identifying 104 a dark object for each spectral band (e.g., determined by the value of 0.1% of the histogram). From this, the radiance of the dark object for each spectral band is derived 106. In parallel, the radiance of the background for each spectral band is derived 108 (the adjacency determination already discussed or an average of the radiance of the entire image, or some other suitable technique). The radiance of both the dark object and of the background, together with the output of the radiative transfer model 46, are used to derive the reflectance 110 of the dark object as well as the reflectance 112 of the background. In other words, once the AOD is known (or we assume we know it) and we have all the values for $G_t$, $G_b$, S, and $L_0$, and the adjacency map, we can simply use Equation 3 to compute the target reflectance ($r_t$). For the background ($r_b$), we can still use Equation 3, but in this case the radiance measured must correspond to the adjacency map or an average of the radiance as discussed above.

From these reflectance values, $L^{sim(t)}$ (the expected radiance for the DO) can be derived 114 and $L^{sim(b)}$ (the expected radiance for the background) can be derived 116. From these two values, $L^{sim}$ (the total TOA radiance from the DO and the background) is derived 118. The comparison or error calculation is then performed 120. A test is made 122 to see if the norm of the error is minimized (e.g., it could be compared to a predetermined threshold). If not, the AOD value is adjusted 124 and the algorithm 100 is repeated to determine new target and background reflectances and new expected target and background radiances and look again at the comparison (or error (CF)). If the error has been minimized, the algorithm is exited and that value of AOD is used in the subsequent surface reflectance calculations and the value of AOD is stored for potential future use.

Figure 5:
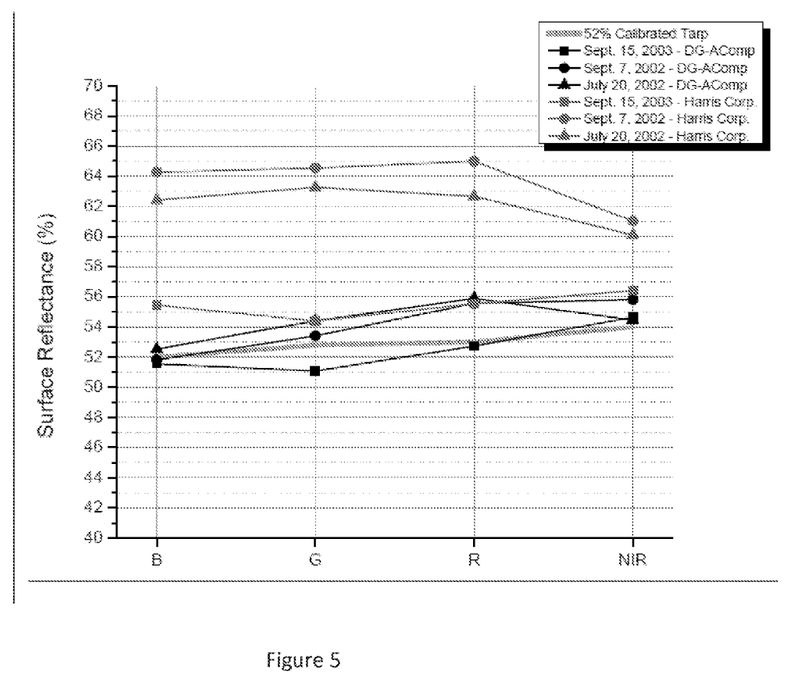
FIG. 5 is a graph comparing the results of the techniques taught herein against a calibrated tarp and against the results achieved following the techniques taught in Riley.

The techniques described herein have been tested: (a) using calibrated tarps (for which surface reflectance is very accurately known) to assess the accuracy of the algorithm in determining reflectance; (b) by comparing the AOD determined by the algorithm to AOD values measured directly by existing systems designed to directly measure the AOD; and (c) with in-situ ASD measurements over various targets. The testing reveals that the algorithms described herein provide both reflectance values and AOD values that closely agree with known values. FIG. 5 shows a comparison between a calibrated tarp, results using the techniques taught by Riley, and results using the techniques taught herein.

The AOD can be determined for a single DO in each image and that value for AOD can be used for each pixel in the image in converting from radiance to surface reflectance. Alternatively, the AOD can be determined for one or more DOs in each image and kriging modeling could be performed between the DOs to provide separate values of AOD for different portions of each image. For example, this could be performed on a pixel-by-pixel basis.

In addition or as an alternative to determining the AOD by finding one or more DOs and calculating the AOD(s) that would provide the measured radiance for the DOs (using historical values of other atmospheric parameters), one could use a similar process with Modeled Atmospheric Correction Objects (MACOs) as is disclosed in concurrently-filed U.S. patent application Ser. No. 13/844,309, entitled "Modeled Atmospheric Compensation Objects," the contents of which are incorporated herein by reference. As another alternative, instead of using a DO or a MACO, the AOD could be determined by looking at any other object for which its surface reflectance is known or could be modeled or predicted. For example, this could be a calibrated target such as a tarp or the like, or through any other suitable means.

As can be appreciated, the techniques taught herein are advantageous because they allow for an automated and accurate method of determining the AOD from image data and historical values from a historical database. With accurate AOD information, an accurate conversion can be made from measured radiance to surface reflectance.

While the embodiments of the invention have been illustrated and described in detail in the drawings and foregoing description, such illustration and description are to be considered as examples and not restrictive in character. For example, certain embodiments described hereinabove may be combinable with other described embodiments and/or arranged in other ways (e.g., process elements may be performed in other sequences). Accordingly, it should be understood that only example embodiments and variants thereof have been shown and described.

I claim:

1. A method of compensating for atmospheric events in satellite images, comprising:
   receiving image data representing an image of at least a portion of the Earth based on the radiance received by a sensor on the satellite, wherein the image data is pixelated and each pixel represents light directed along a path from a target region on the Earth to the sensor, with other portions on the Earth being non-target regions;
   receiving Earth coordinate data related to the image data for the image;
   receiving temporal data related to the image data for the image;
   retrieving one or more atmospheric characteristics from a database, the retrieving being based on the earth coordinate data and the temporal data;
   processing the image data for the image to determine Aerosol Optical Depth for the image, without using image data from another image, wherein the image data used to determine the Aerosol Optical Depth is purely panchromatic image data; and
   converting the image from radiance to surface reflectance by using the determined Aerosol Optical Depth, including correcting for light that satisfies each of the following: (1) has been scattered at least a first time by the atmosphere onto one of the non-target regions, (2) has then been reflected by the one of the non-target regions, and (3) has then been scattered at least a second time by the atmosphere onto the path to the sensor.

2. A method as defined in claim 1, wherein the one or more atmospheric characteristics include water vapor, temperature, elevation, and aerosol type.

3. A method as defined in claim 1, wherein the processing operation includes:
   assuming an Aerosol Optical Depth for at least a portion of the image;
   deriving a surface reflectance of the portion of the image from the Aerosol Optical Depth, the retrieved atmospheric characteristics, and the radiance received;
   calculating an expected radiance for at least the portion of the image based on the derived surface reflectance, the assumed Aerosol Optical Depth, and the retrieved atmospheric characteristics;
   comparing the expected radiance to the actual radiance received for at least the portion of the received image; and
   adjusting the Aerosol Optical Depth in a direction to bring the expected radiance closer to the actual radiance received;

wherein the calculating, comparing, and adjusting operations are performed iteratively until the comparison shows the expected radiance to be within a predetermined threshold of the actual radiance received.

4. A method as defined in claim 3, wherein the deriving the surface reflectance includes deriving the surface reflectance for each of a target portion of the portion and a background portion of the portion.

5. A method as defined in claim 3, wherein the image is used to derive both a radiance received for a target region of the image and a radiance received for a background region of the image.

6. A method as defined in claim 5, wherein the radiance received for the background region is derived by taking an average radiance for the region surrounding the target.

7. A method as defined in claim 5, wherein the radiance received for the background region is derived by using a convolution filter for the region of the image proximate to the target region, in order to account for adjacency effects including light scattered by a plurality of different types of scattering pathways.

8. A method as defined in claim 5, wherein the radiance received for the background region is derived by using a gamma-based filter based on the retrieved atmospheric characteristics and the wavelength of the radiance received.

9. A method as defined in claim 1, wherein the entire method is performed automatically, without human intervention.

10. A method as defined in claim 1, wherein the image data used to determine the Aerosol Optical Depth is purely panchromatic image data.

11. A method as defined in claim 1, wherein the entire method is performed automatically, without human intervention.

12. A method as defined in claim 1, wherein the image data used to determine the Aerosol Optical Depth is purely panchromatic image data.

13. A method as defined in claim 1, wherein the image data used to determine the Aerosol Optical Depth includes multispectral image data.

14. A method as defined in claim 1, wherein the image data is very high spatial resolution image data.

15. A method as defined in claim 1, wherein the converting further includes correcting for light that has been scattered by the atmosphere onto the path to the sensor without ever having reached the Earth (A), light that is scattered by the atmosphere onto the target region and reflected onto the path to the sensor (B2), and light that has been reflected by one of the non-target regions and then scattered by the atmosphere onto the path to the sensor (C1).

* * * * *